United States Patent [19]
Hannick

[11] Patent Number: 5,878,799
[45] Date of Patent: Mar. 9, 1999

[54] PENCIL DRAIN FIXTURE FOR AIRCRAFT DEFUELING

[75] Inventor: Sidney L. Hannick, King George, Va.

[73] Assignee: The United States of America as represented by the Secretary of the Navy, Washington, D.C.

[21] Appl. No.: 929,977

[22] Filed: Sep. 15, 1997

[51] Int. Cl.⁶ ....................................................... B65B 3/04
[52] U.S. Cl. .......................... 141/351; 141/98; 141/332; 141/340; 141/231; 184/1.5; 184/106; 60/39.094
[58] Field of Search .................................... 141/331–342, 141/351–354, 98, 231; 184/1.5, 106; 60/39.094

[56] References Cited

U.S. PATENT DOCUMENTS

| | | | |
|---|---|---|---|
| 3,808,796 | 5/1974 | Spears, Jr. ............................... | 60/39.09 |
| 4,269,237 | 5/1981 | Berger ...................................... | 141/346 |
| 4,539,809 | 9/1985 | Stanley et al. ....................... | 60/39.094 |
| 4,756,349 | 7/1988 | Atkins ..................................... | 141/383 |
| 5,054,282 | 10/1991 | Costa et al. ......................... | 60/39.094 |
| 5,117,876 | 6/1992 | Kuntz .......................................... | 141/7 |
| 5,785,329 | 7/1998 | Stanley ..................................... | 141/98 |

Primary Examiner—J. Casimer Jacyna
Attorney, Agent, or Firm—James B. Bechtel, Esq.

[57] ABSTRACT

A pencil drain fuel fixture for defueling aircraft pencil drains is provided. The pencil drain fixture has an extendable strut with a non-slip rubber base. The strut is set up on the tarmac under an aircraft pencil drain and extended to engage the drain. The upper end of the strut contains a funnel and pencil drain release rod mechanism which opens the pencil drain and by funnel and drain tube directs the fuel to a catch basin.

11 Claims, 2 Drawing Sheets

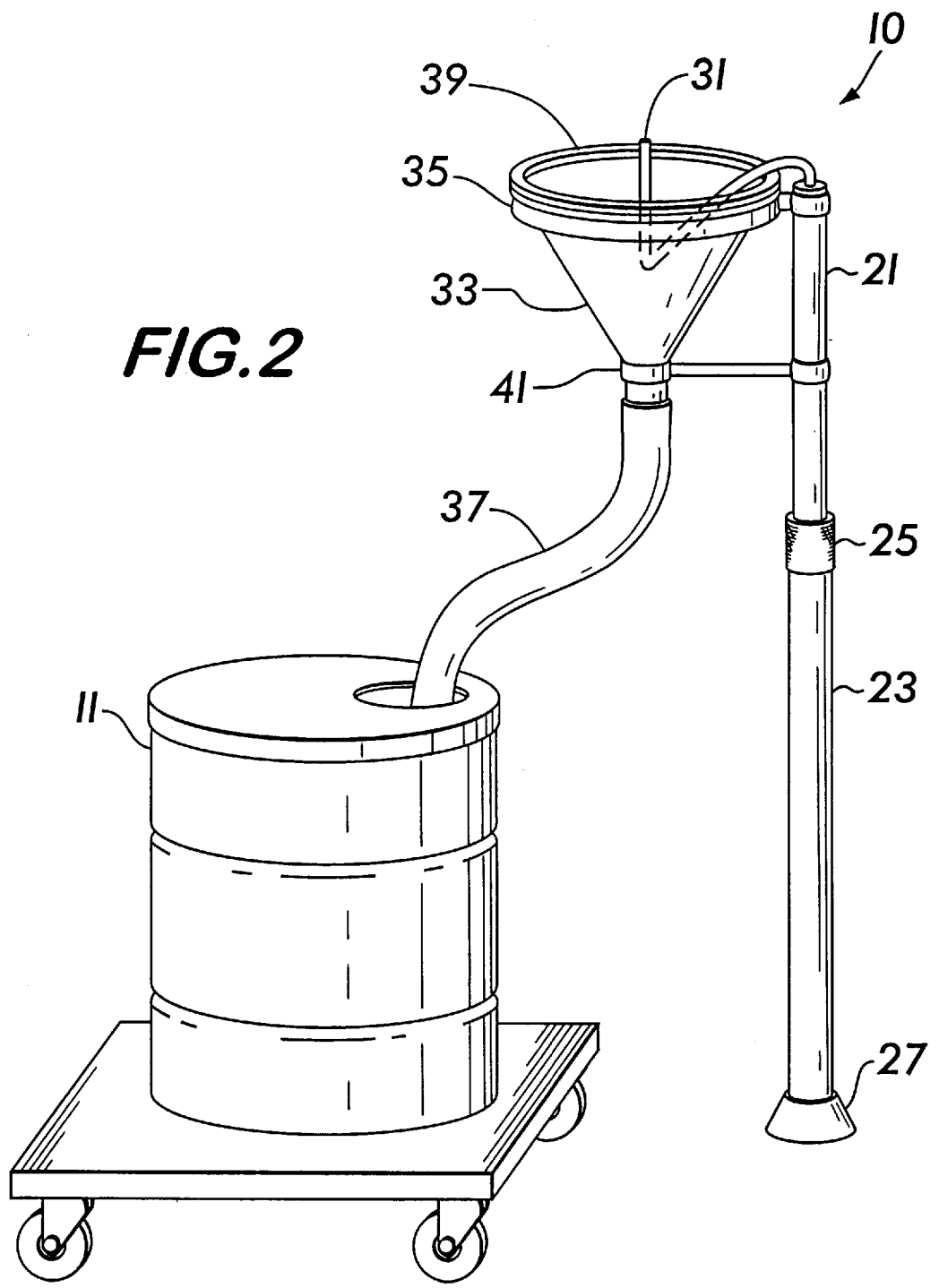

PENCIL DRAIN FIXTURE FOR AIRCRAFT DEFUELING

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention described herein relates to aircraft defueling and in particular to fixtures for operating aircraft pencil drains.

BACKGROUND OF THE INVENTION

Numerous aircraft maintenance procedures require defueling of the aircraft prior to performing these procedures. Included among these procedures are fuel cell maintenance, fuel probe replacements, leak sealing and a number of engine related procedures. Although power-operated defueling is available to remove most of the fuel on a typical Navy fighter aircraft, substantial residual fuel remains in the fuel and engine system. To remove the residual fuel, spring-loaded pencil drains are provided. The Grumman F-14A, for example, has approximately fifteen pencil drains located throughout the aircraft. The amount of fuel released from each pencil drain during a typical defueling can vary from zero to approximately 100 gallons. The current procedure for defueling requires the crewman, while wearing long plastic gauntlets, to depress the pencil drain valve with a screwdriver, or other similar implement. The fuel drains into a catch basin, typically a 100 gallon drum with a large funnel inserted. As the jet fuel is a skin irritant with possible toxic effects, the entire procedure is difficult, messy and time consuming. What is needed is a device to open the pencil drain, contain the discharged fuel and direct it to the catch basin without spillage. Additionally, it is desirable that the crewman not have to manually hold the pencil drain open.

SUMMARY OF THE INVENTION

Accordingly, it is an object of the present invention to provide a defueling fixture for aircraft pencil drains which can lock open the pencil drain valve.

It is a further object of the present invention to provide a defueling fixture for aircraft pencil drains which can be set up to drain unattended.

A still further object of the present invention is to provide a defueling fixture for aircraft pencil drains having an extendable strut for positioning the fixture at different heights.

Yet another object of the invention is to provide a defueling fixture for aircraft pencil drains which contains drained fuel and directs the fuel to a catch basin.

In accordance with these and other objects, the invention is an aircraft pencil drain fixture which is adapted to drain individual pencil drains (containing spring-ball type press open valves) which are numerously located on the under-surfaces of the wings and fuselage of fighter aircraft. The pencil drain fixture has an extendable strut made up of two telescoping sections. The sections can be locked together at various extension lengths by turning a twist-lock clamp at the joint of the two sections. A funnel, drain tube and pencil drain release rod are attached to the upper end of the extendable strut and a non-slip rubber base is attached to the lower end. Defueling is accomplished by extending the strut to depress a pencil drain plunger or ball valve and locking the strut to hold the position. The funnel drain tube is directed to an available catch basin.

BRIEF DESCRIPTION OF THE DRAWINGS

The foregoing objects and other advantages of the present invention will be more fully understood from the following detailed description and reference to the appended drawings wherein:

FIG. 2 is a perspective view of the pencil drain fixture with a fuel catch basin.

DETAILED DESCRIPTION OF THE INVENTION

Figure 1:
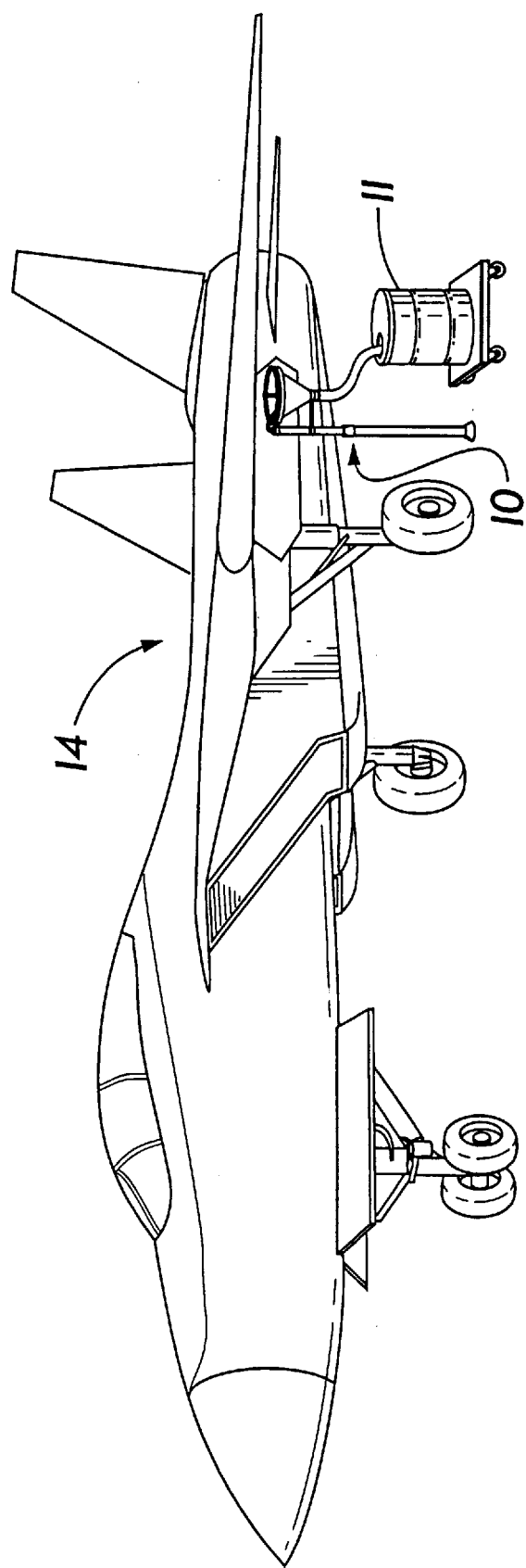
FIG. 1 is a perspective view of the pencil drain fixture installed under the wing of an F-14 aircraft.

Referring now to FIG. 1, the pencil drain fixture 10 of the present invention is shown attached to an under-wing drain on a typical aircraft 14. The pencil drain fixture 10 is draining fuel into a catch basin 11. The catch basin 11, in this example, is a standard 100-gallon drum on a wheeled dolly. Although it is possible to mount the pencil drain fixture 10 on the catch basin dolly, some pencil drains are located in close proximity to under aircraft structures such as landing gear, gear doors, etc. and therefore a preferred embodiment is an independent pencil drain fixture 10 which can be located in tight quarters. Additionally, as there are numerous pencil drains on the F-14 aircraft, independent pencil drain fixtures allow two or more drains to be set up using the same catch basin.

The major components of the pencil drain fixture 10 may be seen by reference to FIG. 2. The catch basin 11 is an existing device into which the pencil drain fixture 10 directs draining fuel. The pencil drain fixture 10 comprises an extendable strut made up of a larger diameter base tube 23 and a smaller diameter upper tube 21 located concentrically within the base tube 23. At the lower end of the base tube, a non-skid foot 27 is provided. In this preferred embodiment, a rubber foot was used. At the upper end of the base tube 23, a twist-lock clamp 25 is located. Upper tube 21 can be extended out of lower tube 23 to any position along its length and can then be locked at variable extensions by twisting the twist-lock clamp 25. Any suitable material may be used for the extendable tubes, such material to be relatively light-weight and fuel-resistant. 6160T6 aluminum tubing was used in the preferred embodiment.

At the top of the upper tube 21, a pencil drain release rod 31 extends out of the top of the tube 21, then bends downward to approximately a 45° angle below horizontal and then bends upward, returning to vertical, the rod forming a z-shape as shown by the hidden lines. The rod 31 should be sufficiently strong so as to activate the pencil drain and also should be sufficiently springy so as to allow pressing the funnel up against the aircraft. As such, the rod 31 should shave movement space within funnel 33 as depicted. The rod is constructed of spring steel rod approximately ¼ inch in diameter. Also attached to the top of the upper tube 21 by an upper ring 35 is a funnel 33 which is in turn connected to a fuel drain hose 37. A soft gasket material 39 is attached to the upper surface of the funnel 33. In suitable pencil drain locations, the funnel 33 may be pressed up against the under surface of the wing or fuselage compressing the gasket material, thereby minimizing fuel spray and blow-off due to winds. Any suitable material may be used for the gasket, providing that it is fuel-resistant. In the preferred embodiment, a fuel-resistant plastic foam is used. Additionally, a stabilizing clamp 41 holds the discharge end of the funnel 33 to the upper tube 21 to stabilize the entire fixture.

In operation, the pencil drain fixture 10 is positioned under an aircraft pencil drain, that is, a drain operated with a spring-loaded, depressible plunger or ball valve. The pencil drain fixture 10 is then extended from the ramp or tarmac to depress the drain valve and to position the funnel 33 so as to capture the released fuel. The released fuel then drains into the funnel 33 and further into an attached drain hose 37 which leads to the fuel catch basin 11. The fuel can then drain, without crewman assistance, until empty. There is no need for special protective gear for the crewmen and no need for opening of the drain valve by hand. Additionally, any nearby-pencil drain may be activated by a second pencil drain fixture 10 to drain into the same fuel catch basin 11.

The features and advantages of the invention are numerous. The pencil drain fixture 10 prevents spillage, prevents contact with fuel by the crewman, allows the crewman to continue other tasks during draining, and allows multiple drains to be set up at the same time. As a result, the defueling time and clean up time is greatly reduced.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A pencil drain fixture for defueling aircraft pencil drains comprising:

a lower tube having a lower end and an upper end and forming the lower part of the extendible strut;

a non-slip base attached to the lower end of said lower tube;

an extendable upper tube having a lower end and an upper end concentrically located within said lower tube;

a twist-lock clamp attached to the upper end of said lower tube and locking said upper and lower tubes together at variable extensions when twisted;

a pencil drain release rod attached to and inserted into said upper tube;

an upper ring attached to the upper end of said upper tube further formed to hold a funnel;

a funnel having an upper surface and a lower discharge end, said funnel inserted into and attached to said upper ring;

a soft gasket material located around the upper surface of said funnel;

a stabilizing clamp attached to said funnel and further attached to said upper tube;

a drain hose attached to the discharge end of said funnel, said hose directing drained fuel to a catch basin.

2. A pencil drain fixture as in claim 1 wherein said lower tube is fabricated of 6160T6 aluminum tubing.

3. A pencil drain fixture as in claim 1 wherein said non-slip base is a rubber base.

4. A pencil drain fixture as in claim 1 wherein sad upper tube is fabricated of 6160T6 aluminum tubing.

5. A pencil drain fixture as in claim 1 wherein said pencil drain release rod is formed in a substantially z-shaped form.

6. A pencil drain fixture as in claim 1 wherein said soft gasket material is a fuel-resistant plastic foam.

7. A pencil drain fixture for defueling aircraft pencil drains comprising:

a vertically extendible strut;

a spring steel rod formed in a substantially z-shaped form for releasing an aircraft pencil drain attached to said extendible strut with one parallel portion of the z-shape being vertically oriented for opening said drain and the other parallel portion of the z-shape being attached to the strut; thereby draining fuel while allowing a range of vertical extensions of said extendible strut and lateral adjustments of said steel rod; and means for collecting the draining fuel attached to said extendable strut.

8. A pencil drain fixture as in claim 7 wherein said extendible strut comprises two aluminum tubes, a smaller and a larger tube, the smaller tube being concentrically located within the larger tube.

9. A pencil drain fixture as in claim 8 wherein said aluminum tube are locked together at a desired extension length using a twist-lock clamp.

10. A pencil drain fixture as in claim 7 wherein said extendible strut has a non-slip base attached thereto.

11. A pencil drain fixture as in claim 7 wherein said means for collecting draining fuel comprises a funnel and attached drain hose.

* * * * *